United States Patent
Kidera et al.

(10) Patent No.: US 6,416,316 B1
(45) Date of Patent: Jul. 9, 2002

(54) APPARATUS FOR MOLDING RESIN PRODUCTS

(75) Inventors: Tadamasa Kidera; Kazuo Suzuki; Hidenori Yokoyama; Koji Nakao, all of Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/657,638

(22) Filed: Sep. 7, 2000

(30) Foreign Application Priority Data

Sep. 29, 1999 (JP) ............................. 11-277430
Mar. 31, 2000 (JP) ....................... 2000-096985

(51) Int. Cl.[7] ........................ B29C 45/40; B29C 45/44
(52) U.S. Cl. ................ 425/556; 425/577; 425/DIG. 58
(58) Field of Search ............................... 425/547, 548, 425/556, DIG. 58, 577

(56) References Cited

U.S. PATENT DOCUMENTS 3,905,740 A * 9/1975 Lovejoy ............... 425/DIG. 58
5,403,179 A * 4/1995 Ramsey ................ 425/DIG. 58
5,925,303 A * 7/1999 Scheliga .............. 425/DIG. 58

FOREIGN PATENT DOCUMENTS

| JP | 7-24845 | 1/1995 |
| JP | 7-223244 | 8/1995 |
| JP | 11-77698 | 3/1999 |

* cited by examiner

Primary Examiner—Tim Heitbrink
(74) Attorney, Agent, or Firm—Pillsbury Winthrop LLP

(57) ABSTRACT

An apparatus for molding a resin product having a bottom plate, a pair of side plates, and a pair of flanges. The side plates are formed integrally with the bottom plate to extend from opposite sides of the bottom plate. Each flange is formed integrally with the associated side plate to extend inward from an upper end of the side plate. The apparatus has a pair of inner slidable cores that shape an upper side of the bottom plate, an inner side of the side plate, and a lower side of the flange. The apparatus also includes an intermediate core located between the inner slidable cores for determining the position of each inner slidable core. The apparatus further includes a sliding mechanism that slides each inner slidable core to a position spaced from the resin product while moving the inner slidable core and the intermediate relative to each other.

12 Claims, 11 Drawing Sheets

APPARATUS FOR MOLDING RESIN PRODUCTS

BACKGROUND OF THE INVENTION

The present invention relates to apparatuses and methods for molding resin products such as console boxes provided in vehicle passenger compartments, and, more particularly, to apparatuses and methods for molding resin products such as console boxes having a flange.

Generally, a shift lever is provided between a vehicle driver seat and an adjacent passenger seat for altering the vehicle speed. A console box is located behind the shift lever for accommodating, for example, music tapes or CD's. The console box is an integral body formed of synthetic resin and has an upper opening that is covered by a lid. The console box is opened and closed with the lid. A flat portion having a predetermined dimension is formed along the upper opening for supporting the lid.

FIGS. 13 and 14 each show examples of prior art console boxes. As shown in FIG. 13, a console box 71 has an outer side plate 72 and an inner side plate 73 and is formed as an integral body. The integral body is molded using a pair of molds that are vertically separated from each other. The console box 71 has a bent portion 74 formed between the outer side plate 72 and the inner side plate 73. The bent portion 74 supports a lid (not shown) with which the console box 71 is opened and closed.

As shown in FIG. 14, a console box 81 includes an upper section 82 and a lower section 83, which are separately molded. The upper section 82 is welded to the lower section 83 at a coupling portion 84. The console box 81 includes an inward flange 85 formed along an upper end of the upper section 82 to face the interior of the box 81. The flange 85 supports a lid (not shown) with which the console box 81 is opened and closed.

The console box 71 of FIG. 13 has a double-walled structure having the outer side plate 72 and the inner side plate 73. This structure reduces the capacity of the console box 71. Further, since the console box 71 has the inner side plate 73 and the outer side plate 72, a relatively large amount of resin material is required for forming the console box 71. This increases costs.

In contrast, the console box 81 of FIG. 14 has a relatively large capacity. However, since the console box 81 includes the inward flange 85, it is impossible to form the console box 81 as an integral body molded with a pair of molds that are vertically separated from each other. Instead, to form the console box 81, the upper section 82 and the lower section 83 must be molded independently. The molded upper and lower sections 82, 83 are then welded to each other. That is, three independent steps are needed for forming the console box 81. This complicates the procedure for forming the console box 81 and increases costs.

SUMMARY OF THE INVENTION

Accordingly, to solve the above problems, it is an objective of the present invention to provide an apparatus and a method for molding resin products by which a resin product having a relatively large capacity is formed efficiently and inexpensively.

To achieve the above objective, the present invention provides an apparatus for molding a resin product having a bottom plate, a pair of side plates, and a pair of flanges. The side plates are formed integrally with the bottom plate to extend from opposite sides of the bottom plate, and each flange is formed integrally with the associated side plate to extend inward from an upper end of the side plate. The apparatus includes a pair of inner slidable cores for shaping an upper side of the bottom plate, an inner side of each side plate, and a lower side of each flange. The apparatus also includes an intermediate core provided between the inner slidable cores for restricting a position of each inner slidable core at a predetermined position. The apparatus further includes a sliding mechanism for sliding each inner slidable core to a position spaced from the resin product while moving the inner slidable core and the intermediate core relative to each other in a vertical direction with respect to a molding position.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS (First Embodiment)

A first embodiment of an apparatus for molding a resin console box for a vehicle according to the present invention will now be described with reference to FIGS. 1 to 6.

First, a console box 21 that is molded by the apparatus of the first embodiment will be described.

Figure 5:
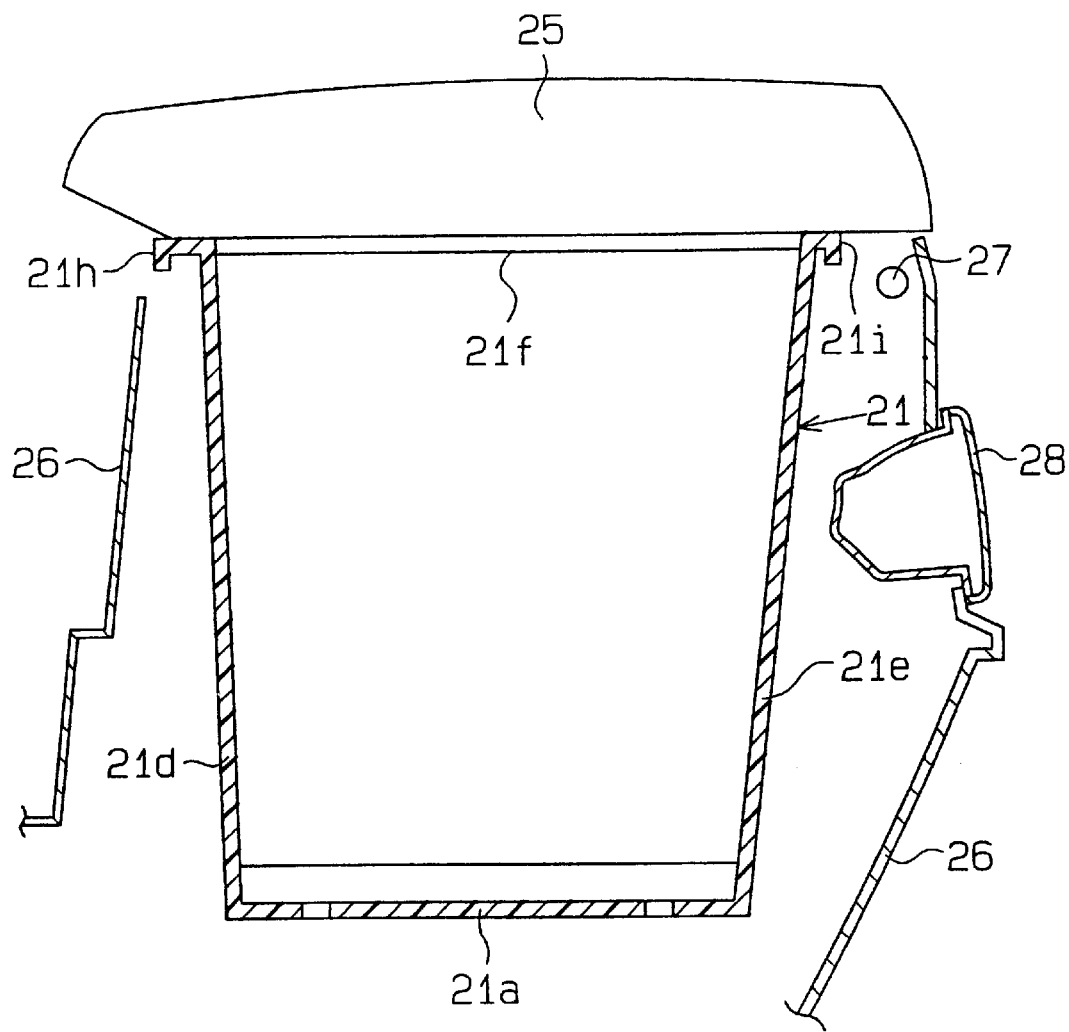
FIG. 5 is a cross-sectional view showing an installed console box.
Figure 6:
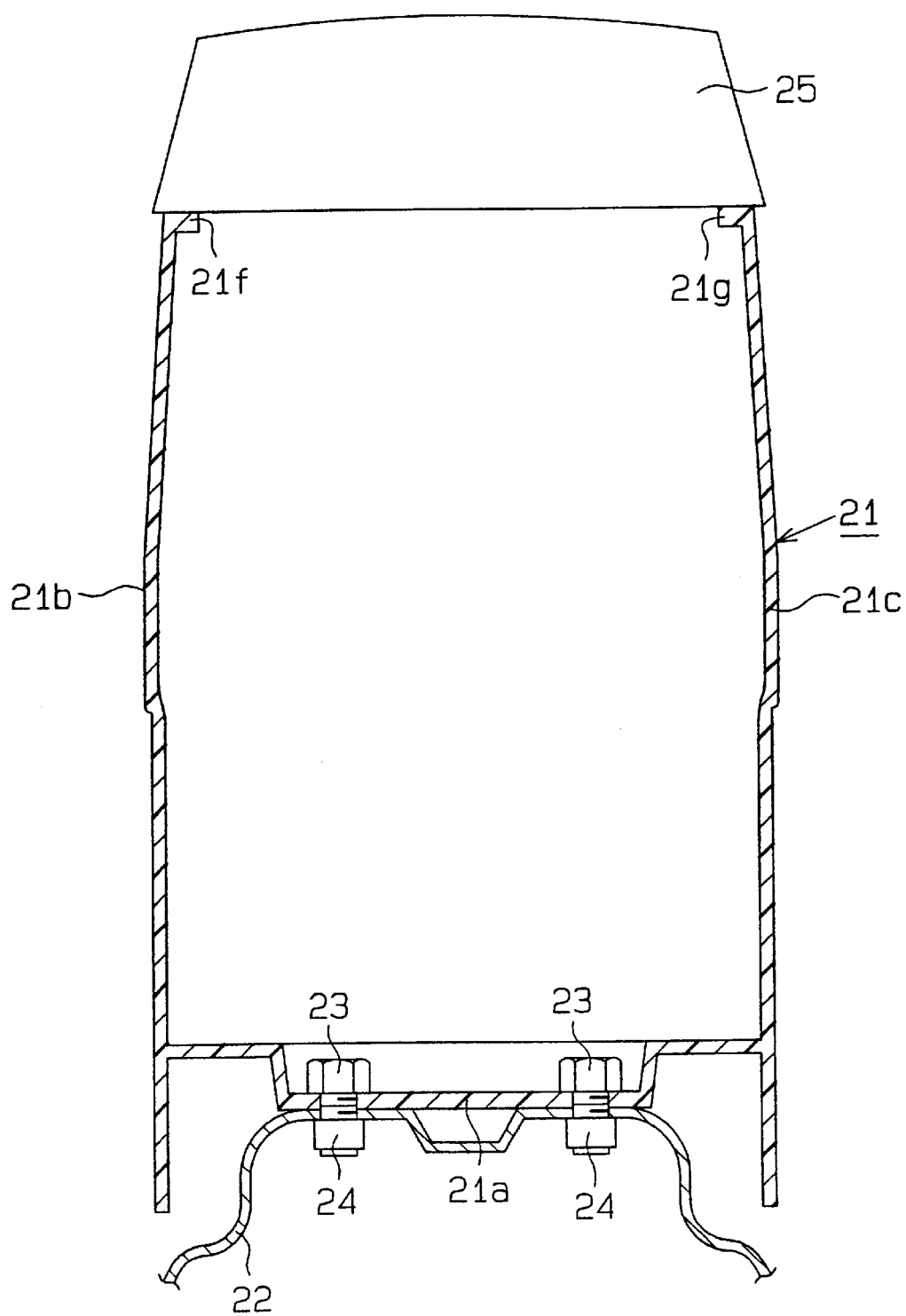
FIG. 6 is another cross-sectional view showing the installed the console box.

As shown in FIG. 6, the console box 21 is secured to a frame 22 provided between a driver seat and an adjacent passenger seat with a plurality of bolts 23 and a plurality of nuts 24. As shown in FIG. 5, a lid 25 is secured to an upper end of an attachment panel 26 through a hinge mechanism 27. The console box 21 is opened and closed with a lid 25, which normally covers an upper opening of the console box 25. An ashtray 28 is coupled to the attachment panel 26.

The console box 21 is generally box-shaped. As shown in FIGS. 5 and 6, the console box 21 includes a bottom plate 21a, a left plate 21b, a right plate 21c, a front plate 21d, and a rear plate 21e. The bottom plate 21a is secured to the frame 22. The left plate 21b, the right plate 21c, the front plate 21d, and the rear plate 21e are formed integrally with the bottom plate 21a. The left plate 21b and the right plate 21c extend from a left end of the bottom plate 21a and a right end of the bottom plate 21a, respectively. The front plate 21d and the rear plate 21e extend from a front end of the bottom plate 21a and a rear end of the bottom plate 21a, respectively. A left flange 21f is formed integrally with the left plate 21b and extends from an upper end of the plate 21b to face the interior of the console box 21. A right flange 21g is formed integrally with the right plate 21c and extends from an upper end of the plate 21c to face the interior of the console box 21. A front flange 21h is formed integrally with the front plate 21d and extends from an upper end of the plate 21d to face the interior of the console box 21. A rear flange 21i is formed integrally with the rear plate 21e and extends from an upper end of the plate 21e to face the interior of the console box 21. The flanges 21f to 21i support the lower side of the lid 25 in a stable manner.

An apparatus 31 for molding the console box 21 will hereafter be described.

As shown in FIGS. 1 to 4, the molding apparatus 21 includes an outer mold 32 and an inner mold 33. The outer mold has a fixed mold member 32a and a movable mold member 34. The fixed mold member 32a shapes an outer side (upper side) of each flange 21f to 21i. The movable mold member 3 shapes an outer side (lower side) of the bottom plate 21a of the console box 21. The movable mold member 34 opposes the fixed mold member 32a and is mover to contact and separate from the fixed mold member 32a. A pair of outer slidable cores 35, 36 are located on a side of the movable mold member 34 closest to the fixed mold member 32a (an upper side of the movable mold member 34), thus opposing each other. The outer slidable core 35 shapes an outer side of the left plate 21b, and the outer slidable core 36 shapes an outer side of the right plate 21c. Each outer slidable core 35, 36 is substantially U-shaped in horizontal cross-section. The outer slidable cores 35, 36 thus shape an outer side of the front plate 21d and an outer side of the rear plate 21e.

The inner mold 33 includes a first inner slidable core 41, a second inner slidable core 42, and an intermediate core 43. The first inner slidable core 41 shapes an inner side of the left plate 21b, and the second inner slidable core 42 shapes an inner side of the right plate 21c. The intermediate core 43 is provided between the first inner slidable core 41 and the second inner slidable core 42 and holds the inner slidable cores 41, 42 at their molding positions. The intermediate core 43 is also used for separating the inner slidable cores 41, 42 from the molded product.

The first inner slidable core 41 includes a plurality of shaping surfaces 41a, 41b, 41c, 41d. The surface 41a shapes a portion of an inner side of the bottom plate 21a, and the surface 41b shapes an inner side of the left plate 21b. The surface 41c shapes a portion of an inner side of the front plate 21d, and the surface 41d shapes a portion of an inner side of the rear plate 21e. The first inner slidable core 41 includes an under-cut shaping surface 41e for shaping a lower side (under-cut surface) of the left flange 21f of the console box 21.

In the same manner, the second inner slidable core 42 includes a plurality of shaping surfaces 42a, 42b, 42c, 42d. The surface 42a shapes a portion of the inner side of the bottom plate 21a, and the surface 42b shapes an inner side of the right plate 21c. The surface 42c shapes a portion of the inner side of the front side plate 21d, and the surface 42d shapes a portion of the inner side of the rear plate 21e. The second inner slidable core 42 includes an under-cut shaping surface 42e for shaping a lower side (under-cut surface) of the right flange 21g of the console box 21.

The intermediate core 43 has a plurality of shaping surfaces 43a, 43b, 43c, 43d, 43e. The surface 43a shapes a portion of the inner side of the bottom plate 21a. The surfaces 43b, 43c are opposed tapered surfaces, and the distance between the surfaces 43b, 43c decreases toward lower ends of the surfaces 43b, 43c, or toward the surface 43a. The surface 43d shapes a portion of the inner side of the front side plate 21d, and the surface 43e shapes a portion of the inner side of the rear plate 21e.

The first inner slidable core 41 has a inclined surface 41f contacting the tapered surface 43b of the intermediate core 43. The second inner slidable core 42 has a inclined surface 42f contacting the tapered surface 43c of the intermediate core 43. The inclined surface 41f of the first inner slidable core 41 includes a pair of parallel dovetail projections 41g, which are engaging projections. The tapered surface 43b of the intermediate core 43 has a pair of parallel dovetail grooves 43f, which are engaging grooves. The projections 41g engage and slide within the associated grooves 43f.

The tapered surface 43c of the intermediate core 43 has a pair of parallel dovetail projections 43g, which are engaging projections. The inclined surface 42f of the second inner slidable core 42 has a pair of parallel dovetail grooves 42g, which are engaging grooves. The projections 43g engage and slide within the associated grooves 42g.

In this embodiment, the dovetail projections 41g of the first inner slidable core 41, the dovetail projections 42g of the second inner slidable core 42, and the dovetail grooves 43f, 43g of the intermediate core 43 form a sliding means for moving each inner slidable core 41, 42 to its separating position, at which the core 41, 42 is separated from a molded product.

Left mold separating rods 44 are connected to an upper side of the first inner slidable core 41 at a plurality of positions. Right mold separating rods 45 are connected to an upper side of the second inner slidable core 42 at a plurality of positions. Central mold separating rods 46 are connected to an upper side of the intermediate core 43 at a plurality of positions. Each mold separating rod 44, 45, 46 is formed by a pipe. Coolant passages 41h, 42h, 43h extend through the first inner slidable core 41, the second inner slidable core 42, and the intermediate core 43, respectively. Coolant water is introduced in the passages 41h, 42h, 43h through the passages of the associated mold separating rods 44, 45, 46. This rapidly cools the resin in the cavity of the molding apparatus 31 to allow the first and second inner slidable cores 41, 42 to be separated from the molded product. Accordingly, the time required for forming the console box 21 is relatively short.

The operation of the molding apparatus 31 for forming the console box 21 will now be described.

Figure 1:
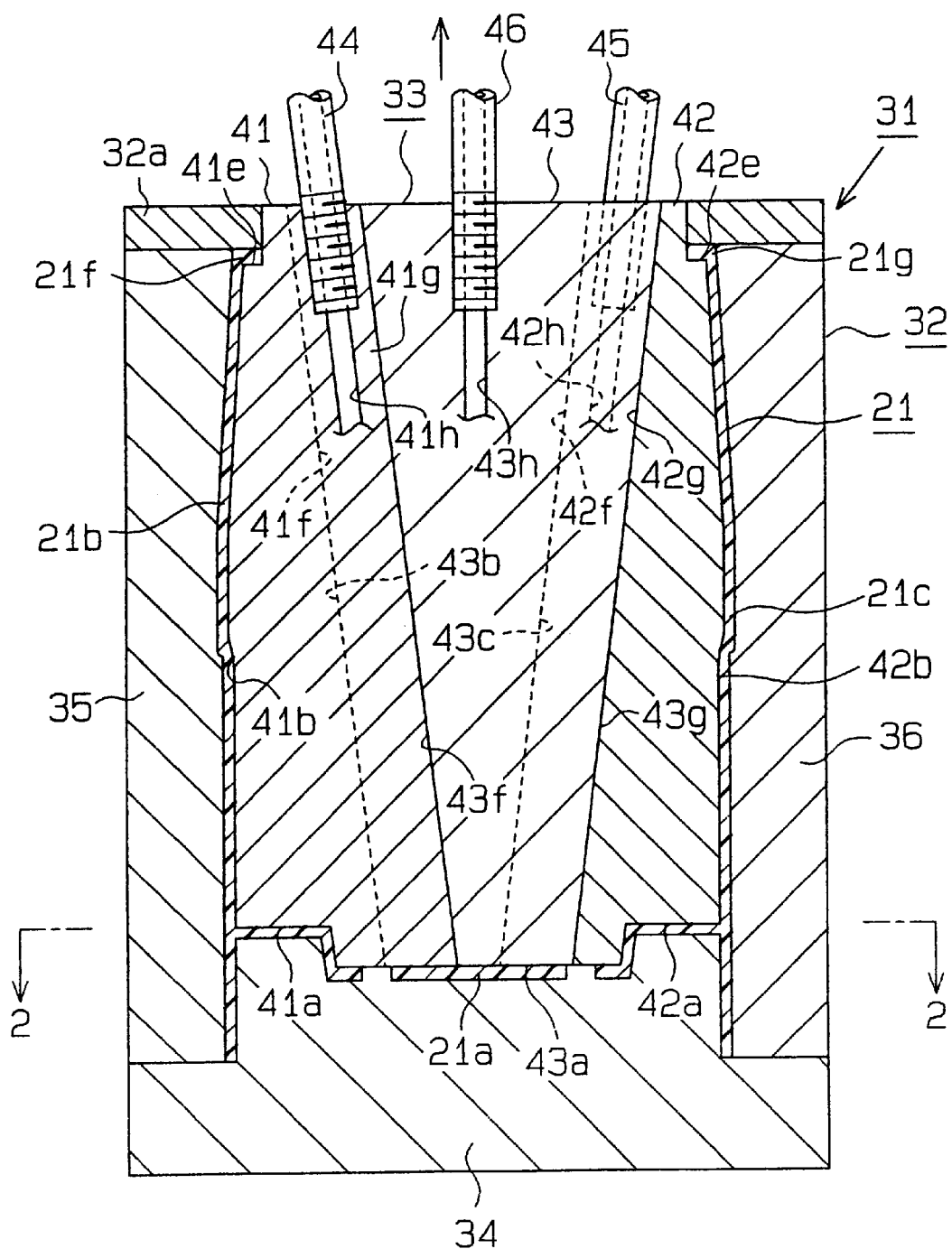
FIG. 1 is a vertical cross-sectional view showing a first embodiment of an apparatus for molding a vehicle console box according to the present invention.
Figure 2:
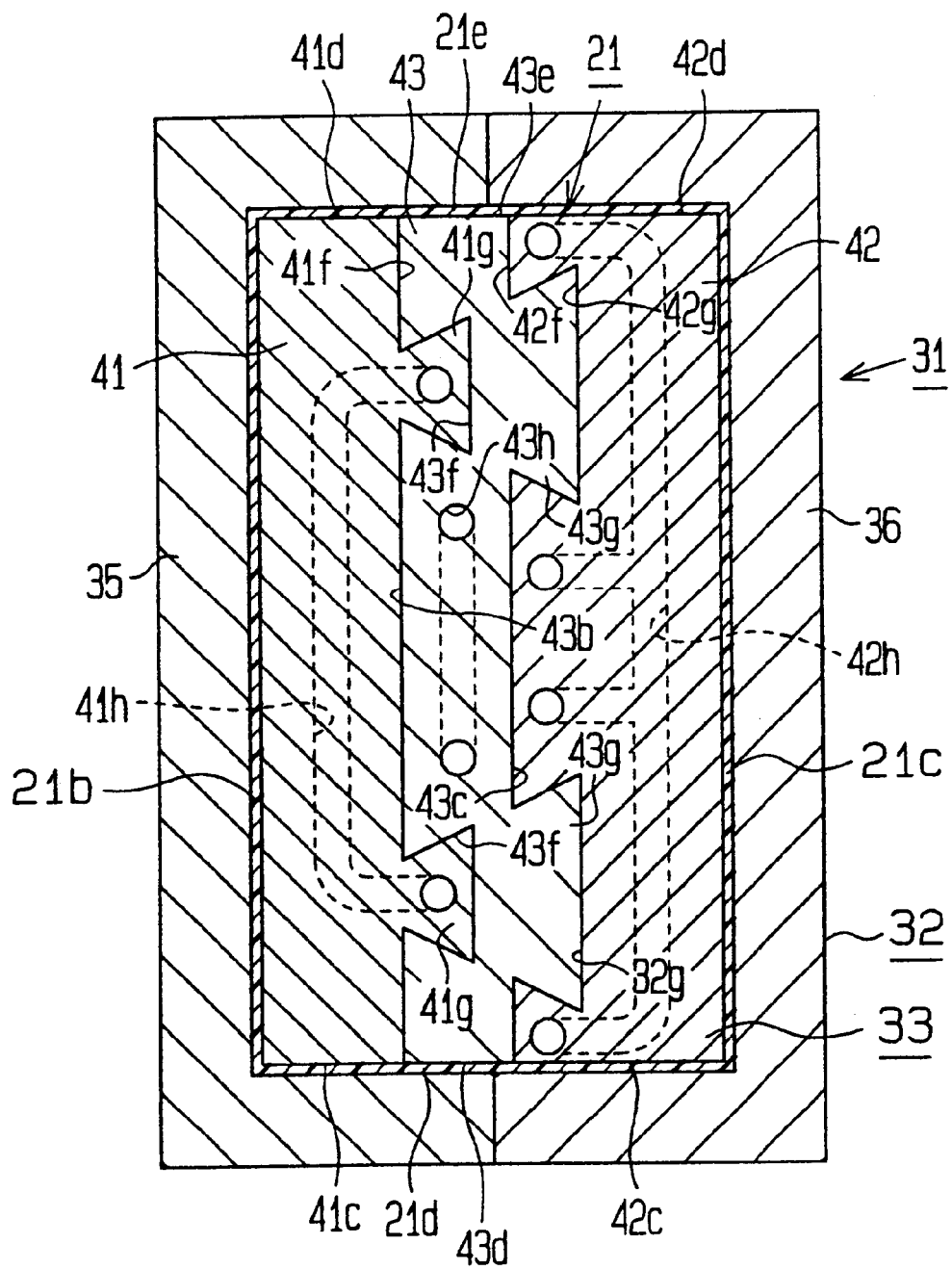
FIG. 2 is a cross-sectional view taken along line 2—2 of FIG. 1.

As shown in FIG. 1, the outer mold 32 and the inner mold 33 are arranged at their molding positions to form a cavity. Molten resin is introduced in this cavity through an inlet (not shown) to form the console box 21.

In this state, coolant water is supplied from a coolant water supply (not shown) to the coolant passages 41h, 42h, 43h of the cores 41, 42, 43 through the passages of the mold separating rods 44, 45, 46. The coolant water is circulated in the passages 41h, 42h, 43h to cool the cores 41, 42, 43, thus rapidly cooling the heated molten resin in the cavity. This quickly hardens the resin and allows the inner slidable cores 41, 42 to be separated from the molded product, or the console box 21. Accordingly, the time required for forming the console box 21 is relatively short.

Figure 3:
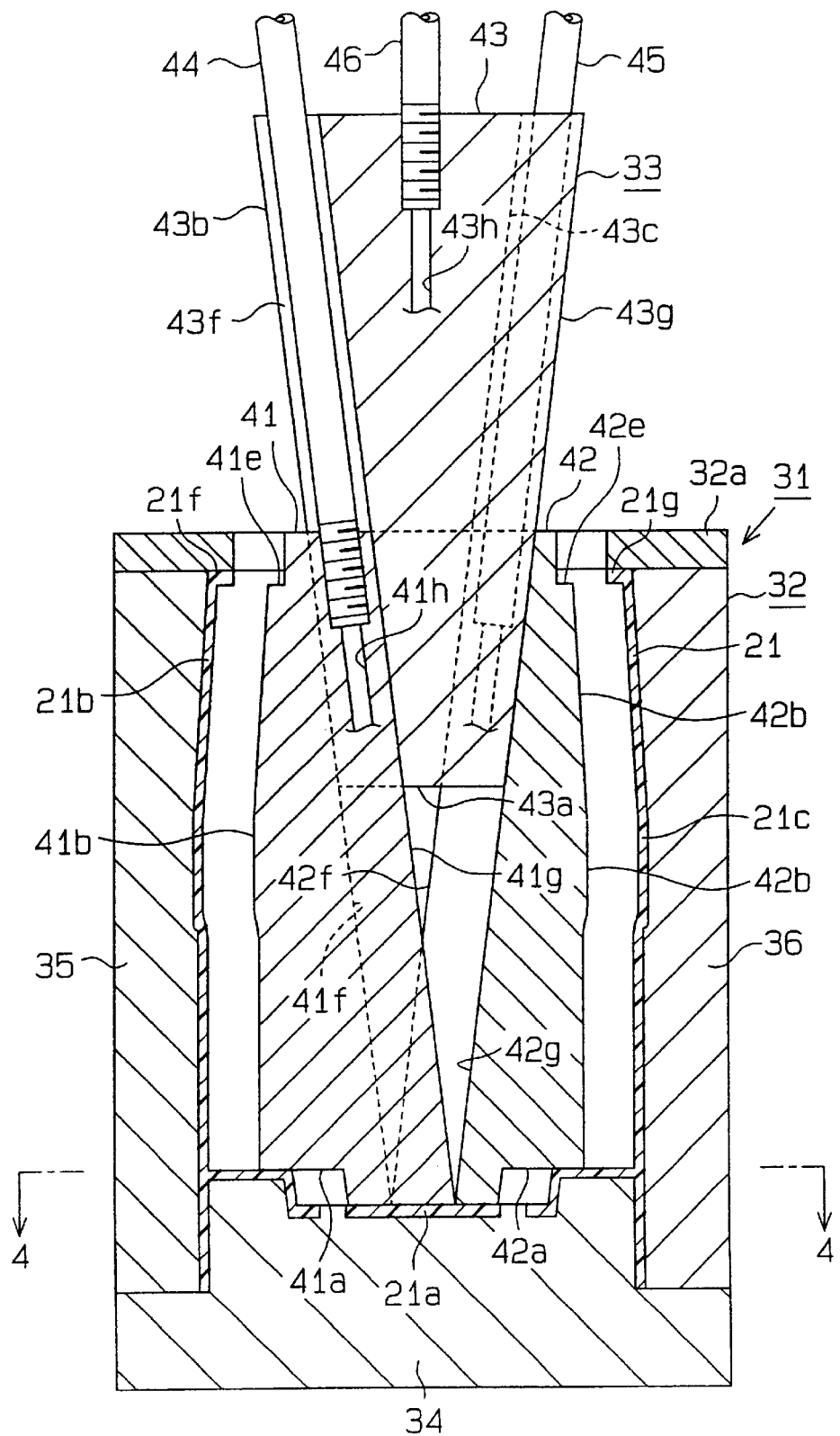
FIG. 3 is a vertical cross-sectional view showing a state of the apparatus of FIG. 1 in which molds are separated from a molded product.
Figure 4:
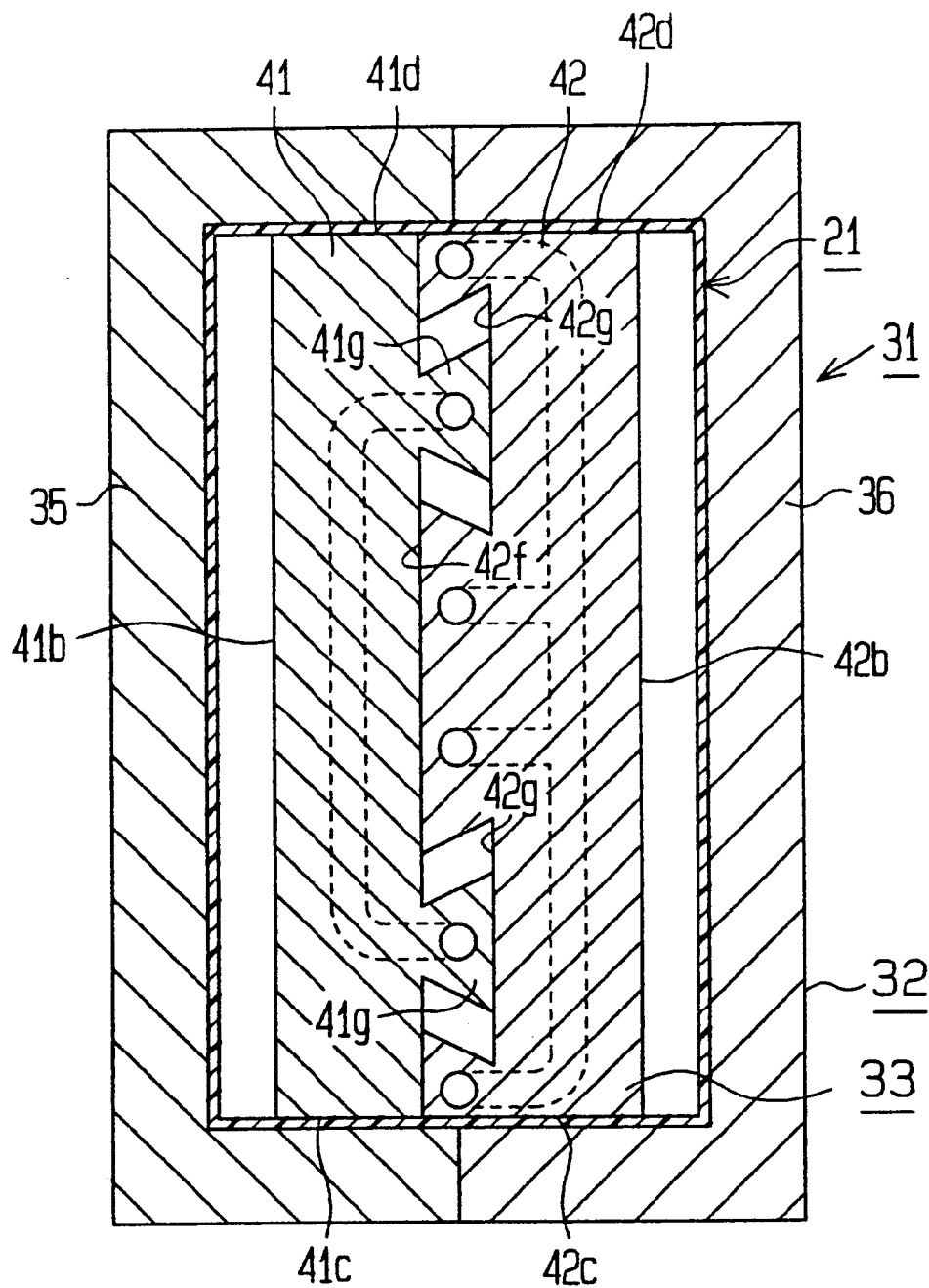
FIG. 4 is a cross-sectional view taken along line 4—4 of FIG. 3.

When separating the first and second inner slidable cores 41, 42 from the molded product, the intermediate core 43 is lifted by means of the mold separating rods 46, which are located in the middle of the apparatus 31, as viewed in FIG. 1. In this state, the engagement between the projections 41g, 43g and the associated grooves 43f, 42g causes the inner slidable cores 41, 42 to move horizontally toward each other without moving upward, as shown in FIG. 3. When the intermediate core 43 is raised to a predetermined intermediate height, the projections 41g of the first inner slidable core 41 engage with the associated grooves 42g of the second inner slidable core 42, as shown in FIG. 4.

In this state, as shown in FIG. 3, the under-cut shaping surfaces 41e, 42e of the inner slidable cores 41, 42 are spaced inward from the associated flanges 21f, 21g of the console box 21. Each inner slidable core 41, 42 is thus held at a separating position at which the core 41, 42 is allowed to be separated upward from the molded product. Subsequently, the inner slidable cores 41, 42 and the intermediate core 43 are integrally separated upward from the molded product, or the console box 21, by means of the mold separating rods 44, 45, 46.

Next, the movable mold member 34 and the outer slidable cores 35, 36, which form the outer mold 32, are separated outward from the console box 21. In this manner, the console box 21 is parted from the molding apparatus 31, and the molding procedure is completed.

Before repeating the molding procedure, the parts of the apparatus 31 are placed at their molding positions in the reverse order of the separation process.

The advantages of the molding apparatus 31 for forming the console box 21, together with its configuration, will hereafter be described.

(1) In the first embodiment, the inner mold 33 is formed by the inner slidable cores 41, 42 and the intermediate core 43 that is arranged between the inner slidable cores 41, 42. The dovetail grooves 43f and the dovetail projections 43g extend along the associated tapered surfaces 43b, 43c, the distance between which decreases toward the lower end of the intermediate core 43. The dovetail projections 41g project from the inclined surface 41f of the slidable core 41, which contacts the tapered surface 43b of the intermediate core 43. The projections 41g engage with the grooves 43f of the intermediate core 43. The dovetail grooves 42g are formed in the inclined surface 42f of the second inner slidable core 42, which contacts the tapered surface 43c of the intermediate core 43. The grooves 42g engage with the projections 43g of the intermediate core 43.

This structure firmly holds the inner mold 33, which includes the inner slidable cores 41, 42 and the intermediate core 43. In other words, the engagement between the projections 41g, 43g and the associated grooves 43f, 42g holds the inner slidable cores 41, 42 at their molding positions in a stable manner when resin is introduced in the cavity. Thus, when forming the console box 21, the inner slidable cores 41, 42 are prevented from moving. This suppresses formation of flash and displacement of parting lines in the console box 21. Further, when resin is put in the cavity, the inner slidable cores 41, 42 are prevented from vibrating, and resin does not enter the space between the intermediate core 43 and the inner slidable cores 41, 42. This prolongs life of the molding apparatus 31.

Further, the intermediate core 43 is moved relative to the inner slidable cores 41, 42 by lifting the intermediate core 43 with respect to the inner slidable cores 41, 42. In this state, the contact between the tapered surfaces 43b, 43c and the associated slanted surfaces 41f, 42f and the engagement between the projections 41g, 43g and the associated grooves 43f, 42g allow the inner slidable cores 41, 42 to slide toward each other without applying force to the molded product. That is, relative movement between the intermediate core 43 and the inner slidable cores 41, 42 is smooth. Each inner slidable core 41, 42 is thus readily and reliably moved to its separating position. This ensures the separation of the under-cut shaping surfaces 41e, 42e from the associated flanges 21f, 21g. Accordingly, the inner mold 33 is readily and reliably separated from the molded product, or the console box 21. The procedure of the first embodiment is thus optimal for forming a console box with an increased capacity while reducing costs.

(2) In the first embodiment, when each inner slidable core 41, 42 is located at its separating position, a lower portion of each projection 41g of the first slidable core 41 engages with a lower portion of the associated groove 42g of the second slidable core 42.

The distance between the molding position and the separating position of each inner slidable core 41, 42 is thus relatively long. That is, the inner slidable cores 41, 42 are located relatively close to each other at their separating positions. This ensures sufficient separation of the under-cut shaping surfaces 41e, 42e from the associated flanges 21f, 21g of the console box 21. Accordingly, the inner slidable cores 41, 42 are readily separated from the console box 21.

(3) In the first embodiment, the coolant passages 41h, 42h are formed in the first and second inner slidable cores 41, 42, respectively. Coolant water is circulated in the passages 41h, 42h. This rapidly cools the resin in the cavity to allow the inner slidable cores 41, 42 to be separated from the molded product, or the console box 21. Accordingly, the time required for forming the console box 21 is relatively short.

(4) In the first embodiment, the inner side of the front plate 21d and the inner side of the rear plate 21e are shaped by the associated shaping surfaces 41c, 41d, 42c, 42d, 43d, 43e of the cores 41, 42, 43. The square console box 21 is thus easily formed.

(5) In the first embodiment, the mold separating rods 44, 45, 46 are provided in the associated cores 41, 42, 43. Each inner slidable core 41, 42 is moved to its separating position appropriately by lifting the intermediate core 43 by means of the associated rod 46. Further, the inner mold 33 is easily separated from the molded product by means of the rods 44, 45, 46.

(Second Embodiment)

A second embodiment of the present invention will now be described with reference to FIGS. 7 to 10. Same or like reference numerals are given to parts in FIGS. 7 to 10 that are the same as or like corresponding parts in FIGS. 1 to 6. A detailed description of these parts will be omitted.

Figure 7:
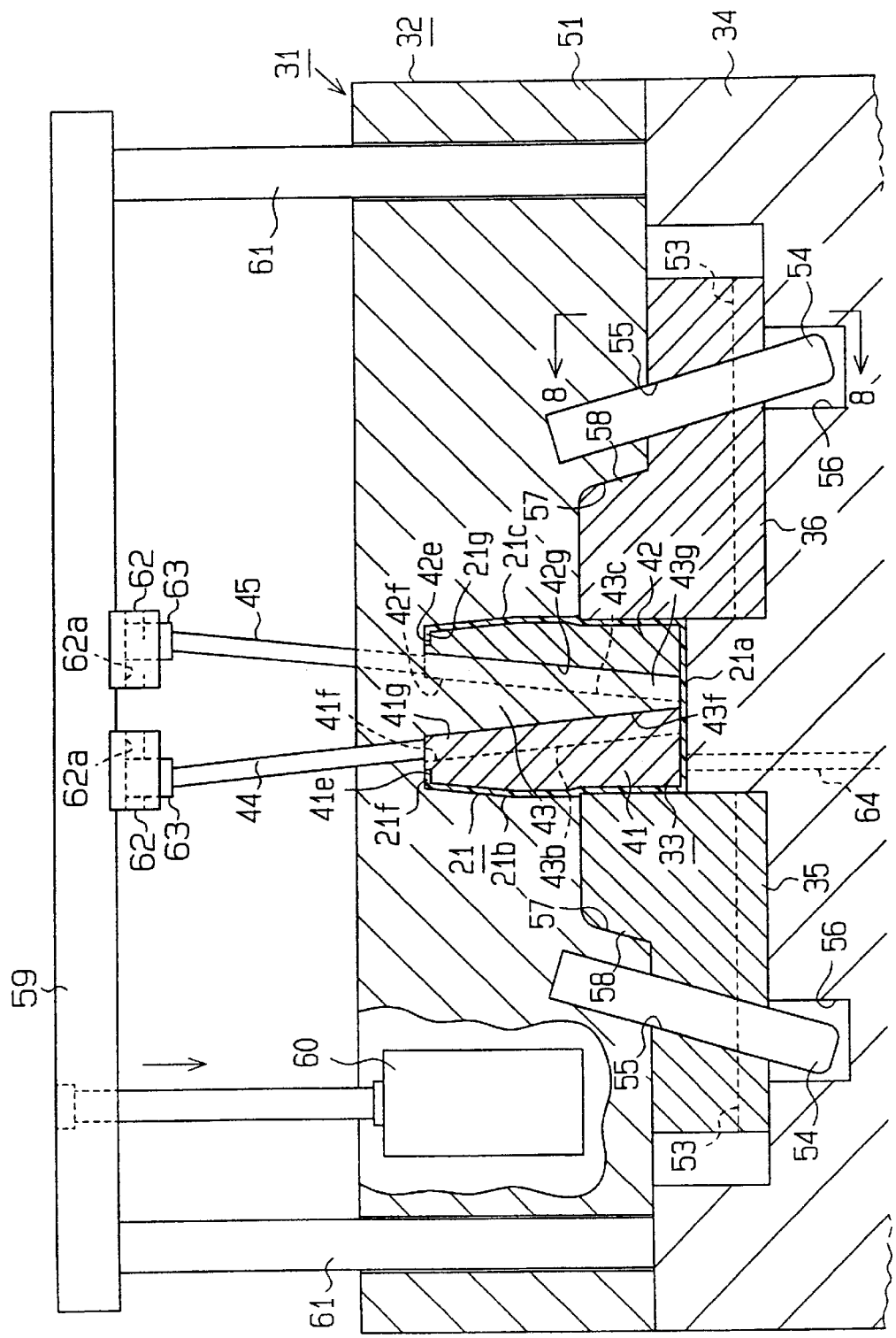
FIG. 7 is a vertical cross-sectional view showing a second embodiment of a main portion of an apparatus for molding a console box according to the present invention.

As shown in FIG. 7, the apparatus 31 of the second embodiment includes an outer mold 32 and an inner mold 33. The outer mold 32 shapes an outer side of the console box 21, and the inner mold 33 shapes an inner side of the console box 21. The outer mold 32 includes a fixed mold 51, a movable mold member 34 opposing the fixed mold 51, a first outer slidable core 35, and a second outer slidable core 36. The movable mold member 34 is moved vertically to contact and separate from a lower side of the fixed mold 51. The first and second outer slidable cores 35, 36 are supported by an upper side of the movable mold member 34. The outer slidable cores 35, 36 are movable horizontally along the upper side of the movable mold member 34.

Figure 8:
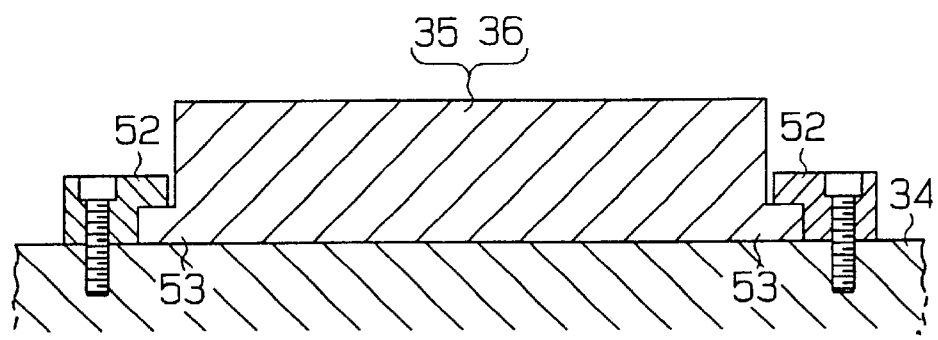
FIG. 8 is a cross-sectional view taken along line 8—8 of FIG. 7.

As shown in FIG. 8, pairs of guide members 52, which engage the slidable cores 35, 36, are attached to the upper side of the movable mold member 34. The guide members 52 are located at opposite sides of the associated outer slidable cores 35, 36 in a direction parallel to the plane of FIG. 7. The guide members 52 of the first outer slidable core 35 are spaced from the guide members 52 of the second outer slidable core 36 by predetermined intervals. Each outer slidable core 35, 36 has a pair of projections 53 projecting from its sides to engage with the associated guide members 52. The guide members 52 support the outer slidable cores 35, 36. The cores 35, 36 are thus allowed to move integrally with the movable core 34 in a vertical direction and to slide relative to the movable mold member 34 in a horizontal direction.

As shown in FIG. 7, a pair of inclined pins 54 project downward from the fixed mold 51. An inclined engaging hole 55 extends through each outer slidable core 35, 36. The pins 54 are inserted through the holes 55 of the outer slidable cores 35, 36 and slide with respect to the holes 55. A pair of recesses 56 are formed in the upper side of the movable mold member 34. The pins 54 project into the associated recesses 56.

Figure 10:
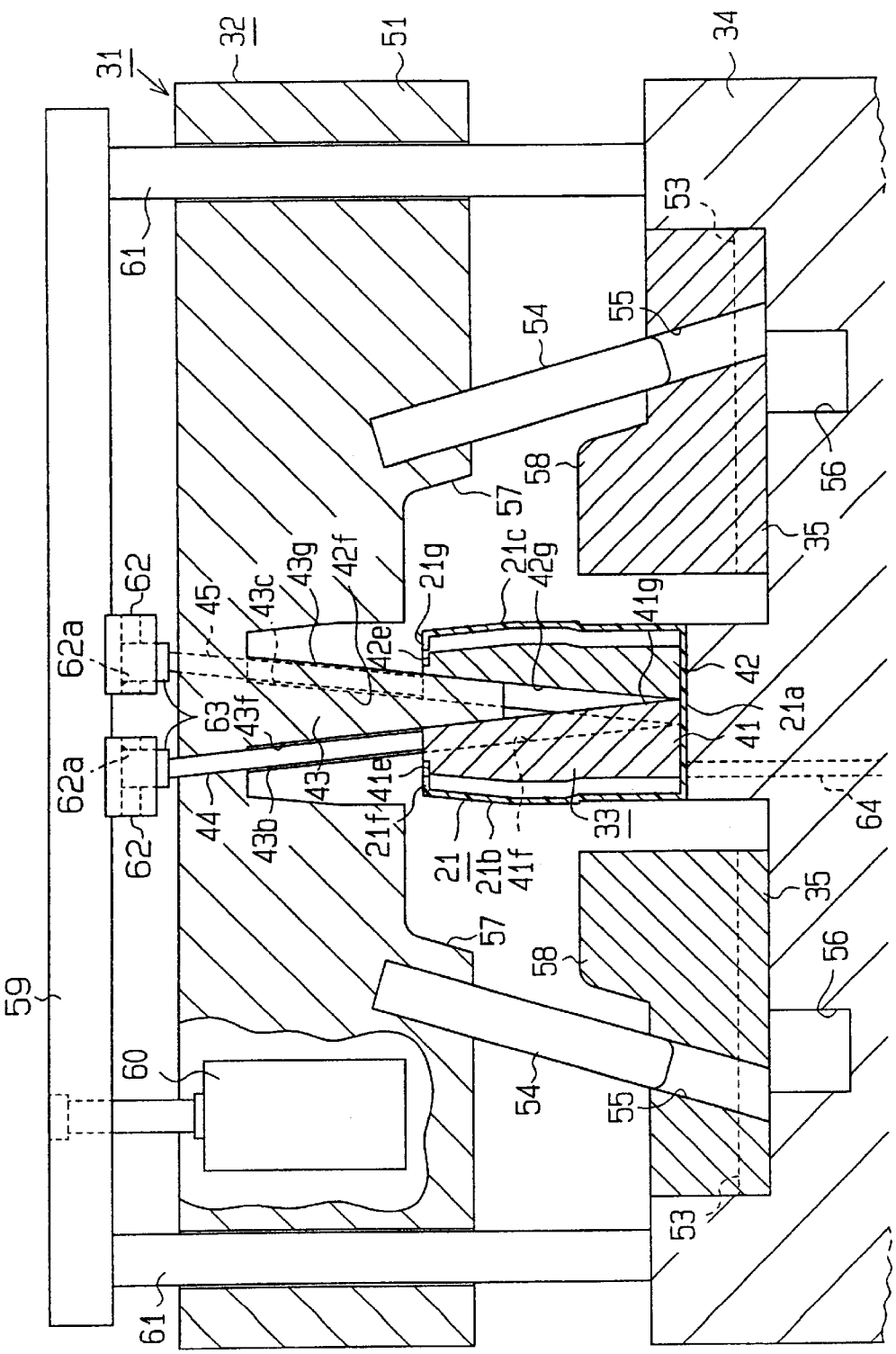
FIG. 10 is a vertical cross-sectional view showing a state of the apparatus of FIG. 7 in which molds are separated from the molded product.

The movable mold member 34 is lifted by a drive mechanism (not shown) to its molding position at which the movable mold member 34 contacts the fixed mold 51, as shown in FIG. 7. Meanwhile, the pins 54, which are engaged with the associated engaging holes 55, move the outer slidable cores 35, 36 toward each other. The outer slidable cores 35, 36 are thus located at their inner positions, or molding positions. The movable mold member 34 is lowered by the drive mechanism to its separating position at which the movable mold member 34 is separated from the fixed mold 51, as shown in FIG. 10. Meanwhile, the pins 54 separate the outer slidable cores 35, 36 from each other. The outer slidable cores 35, 36 are thus located at their outer positions, or separating positions.

A positioning recess 57 is formed in the lower side of the fixed mold 51. A positioning projection 58 projects from an upper side of each outer slidable core 35, 36 at a position corresponding to the positioning recess 57. As shown in FIG. 7, when the movable mold member 34 is located at its molding position, the positioning projections 58 engage with the positioning recess 57. The movable mold member 34 is thus positioned at its predetermined molding position.

As shown in FIG. 7, the inner mold 33 has an intermediate core 43, a first inner slidable core 41, and a second inner slidable core 42. The intermediate core 43 is formed integrally with the fixed mold 51 to project downward from the middle of the fixed mold 51. The first and second inner slidable cores 41, 42 are provided at opposite sides of the intermediate core 43. Like the first embodiment, tapered surfaces 43b, 43c are formed along opposite sides of the intermediate core 43. The distance between the tapered surfaces 43b, 43c decreases toward the lower end of the intermediate core 43. Further, the tapered surface 43b has a pair of dovetail grooves 43f, and the tapered surface 43c has a pair of dovetail projections 43g. The first inner slidable core 41 has an inclined surface 41f formed along an inner side of the core 41. The second inner slidable core 42 has an inclined surface 42f formed along an inner side of the core 42. The inclined surface 41f contacts the tapered surface 43b, and the inclined surface 42f contacts the tapered surface 43c. The inclined surface 41f has a pair of dovetail projections 41g engaging with the dovetail grooves 43f of the intermediate core 43. The inclined surface 42f has a pair of dovetail grooves 42g engaging with the dovetail projections 43g of the intermediate core 43.

A pressing plate 59 is located above the fixed mold 51 and moves vertically, as shown in FIG. 7. The pressing plate 59 is raised and lowered by a hydraulic cylinder 60, or an urging means. A plurality of return pins 61, which are transmitting means, project downward from a lower side of the pressing plate 59. Each return pins 61 has a lower end facing the upper side of the movable mold member 34. The lower end of the return pin 61 thus comes into contact with the upper side of the movable mold member 34 when the pressing plate 59 is lowered toward the movable mold member 34. That is, if the pressing plate 59 is lowered through the hydraulic cylinder 60 when the movable mold member 34 is located at its molding position of FIG. 7, the return pins 61 contact the movable mold member 34 to temporarily restrict the downward movement of the pressing plate 59. If the movable mold member 34 is lowered by the drive mechanism to its separating position, the pressing plate 59 is lowered integrally with the movable mold member 34.

Figure 9:
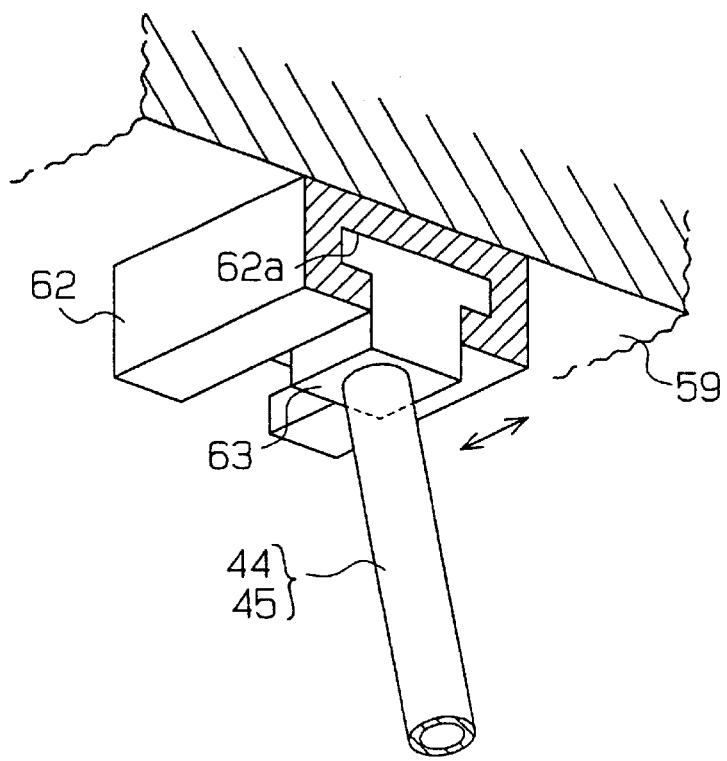
FIG. 9 is an enlarged, perspective view showing a main portion of a structure for moving a mold separating rod.

As shown in FIGS. 7 and 9, a plurality of supports 62 are secured to the lower side of the pressing plate 59. A guide groove 62a is formed in a lower side of each support 62. A movable barrel 63 is received in each guide groove 62a and moves horizontally (rightward or leftward in FIG. 7). A mold separating rod 44, 45 formed by a pipe projects downward from each movable barrel 63. The mold separating rod 44 is inclined to match the inclined surface 41f of the first inner slidable core 41. The mold separating rod 45 is inclined to match the inclined surface 42f of the second inner slidable core 42. A lower end of each mold separating rod 44, 45 is connected to an upper end of the associated inner slidable core 41, 42.

When the downward movement of the pressing plate 59 through the hydraulic cylinder 60 is temporarily restricted by the movable mold member 34 located at its molding position, force acts on the inner slidable cores 41, 42 through the associated rods 44, 45 to urge the cores 41, 42 downward. Further, when the movable mold member 34 is lowered from its molding position toward its separating position with the pressing plate 59 moving integrally with the movable mold member 34, the inner slidable cores 41, 42 are moved downward relative to the intermediate core 43 by means of the associated rods 44, 45, as shown in FIG. 10. In this state, like the first embodiment, the engagement among the inner slidable cores 41, 42 and the intermediate core 43 through the projections 41g, 43g and the associated grooves 43f, 42g causes the inner slidable cores 41, 42 to slide horizontally toward each other. Each inner slidable core 41, 42 is thus located at its separating position.

In the second embodiment, although not illustrated, a coolant passage is formed in each inner slidable core 41, 42, like the first embodiment. Coolant water is supplied to these passages through the associated rods 44, 45 and circulated in the coolant passages to cool the resin in the cavity, thus forming the console box 21.

The operation of the molding apparatus 31 for forming the console box 21 will hereafter be described.

As shown in FIG. 7, the movable mold member 34 is located at its upper position, or molding position at which the movable mold member 34 contacts the fixed mold 51. In this state, the first and second outer slidable cores 35, 36 are located at their inner positions, or molding positions. Further, the first and second inner slidable cores 41, 42 are located at their outer positions, or molding positions. The fixed mold 51, the movable mold member 34, the outer slidable cores 35, 36, and the inner slidable cores 41, 42 thus form a cavity in which resin is introduced through an inlet (not shown) for forming the console box 21.

To isolate the molded product, or the console box 21, from the cavity, a piston rod of the hydraulic cylinder 60 is retracted in a body of the cylinder 60. The pressing plate 59 is thus urged to move downward. The pins 61 projecting from the lower side of the pressing plate 59 then contact the movable mold member 34, thus temporarily restricting the downward movement of the plate 59. In this state, the downward force acting on the pressing plate 59 urges the inner slidable cores 41, 42 downward through the rods 44, 45.

Afterwards, when the drive mechanism (not shown) moves the movable mold member 34 from its separating position toward its lower position, or separating position, the downward movement of the pressing plate 59 is no longer restricted. This enables the pressing plate 59 to move downward integrally with the movable mold member 34. The pressing plate 59 thus lowers the inner slidable cores 41, 42 by means of the rods 44, 45. This separates the cores 44, 45 from the intermediate core 43, thus locating the cores 41, 42 at their separating positions, as shown in FIG. 10. In this state, the console box 21 is separated downward from the fixed mold 51 as clamped by the movable mold member 34 and the inner slidable cores 41, 42.

When the inner slidable cores 41, 42 are separated downward from the intermediate core 43, the engagement between the projections 41g, 43g and the associated grooves 43f, 42g causes the inner slidable cores 41, 42 to slide horizontally toward each other. This separates the undercut shaping surfaces 41e, 42e of the cores 41, 42 from the associated flanges 21f, 21g located at upper inner positions of the console box 21. Each inner slidable cores 41, 42 is thus located at its separating position.

As mentioned, the upper ends of the mold separating rods 44, 45, which project from the associated inner slidable cores 41, 42, are supported by the lower side of the pressing plate 59 through the movable barrels 63 and the supports 62. That is, when the inner slidable cores 41, 42 move horizontally, the movable barrels 63 are guided by the guide grooves 62a formed in the associated supports 60 to move rightward or leftward, as viewed in FIGS. 7 and 10. This allows the rods 44, 45 to move accordingly.

When the movable mold member 34 is lowered toward its separating position, the slanted pins 54, which engaged with the associated engaging holes 55, separate the outer slidable cores 35, 36 from each other. The outer slidable cores 35, 36 are thus located at their separating positions.

Afterwards, the piston rod of the hydraulic cylinder 60 is projected from the cylinder body, thus raising the pressing plate 59. The inner slidable cores 41, 42 are thus separated upward from the molded product, or the console box 21, by means of the mold separating rods 44, 45. In this state, the console box 21 is separated upward from the movable mold member 34 by a knock pin 64, thus isolating the console box 21 from the molding apparatus 31.

The second embodiment has the following advantages in addition to the items (1) to (4) described for the first embodiment.

(5) In the second embodiment, the intermediate core 43 is fixed to the fixed mold 51, and the inner slidable cores 41, 42 are moved relative to the intermediate core 43. Meanwhile, the engagement among the cores 41, 42, 43 through the projections 41g, 43g and the grooves 43f, 42g causes each inner slidable core 41, 42 to slide to its separating position.

That is, the inner slidable cores 41, 42 are moved appropriately to their separating positions by separating the cores 41, 42 from the intermediate core 43. The inner slidable cores 41, 42 are then moved integrally with the movable mold member 34 of the outer mold 32 toward the separating position of the movable mold member 34. It is thus unnecessary to raise the intermediate core 43. Accordingly, the apparatus 31 does not need a drive mechanism for moving the intermediate core 43, thus minimizing the apparatus 31 as a whole. Further, the console box 21 is quickly separated from the apparatus 31 when molding is completed.

(6) In the second embodiment, relative movement of the inner slidable cores 41, 42 with respect to the intermediate core 43 occurs substantially at the same time as the separation of the movable mold member 34 of the outer mold 32 from the molded product. The inner slidable cores 41, 42 are thus moved to their separating positions without applying undesired force on the molded product, or the console box 21. The console box 21 is thus readily and reliably separated from the molding apparatus 31.

(7) In the second embodiment, the inner slidable cores 41, 42 are urged toward their separating positions by the hydraulic cylinder 60, even when the movable mold member 34 remains in contact with the fixed mold 51. If the movable mold member 34 is separated from the fixed mold 51, the movement of the movable mold member 34 is transmitted to the inner slidable cores 41, 42 through the return pins 61, the pressing plate 59, and the mold separating rods 44, 45.

This structure ensures that the inner slidable cores 41, 42 are moved integrally with the movable mold member 34 that is separated from the fixed mold 51 to its separating position. The console box 21 is thus readily and reliably separated from the apparatus 31 when molding is completed.

(Modifications)

Although only two embodiments of the present invention have been described herein, it should be apparent to those skilled in the art that the present invention may be embodied in many other specific forms without departing from the sprit or scope of the invention. Particularly, it should be understood that the invention may be embodied in the following forms.

Figure 11:
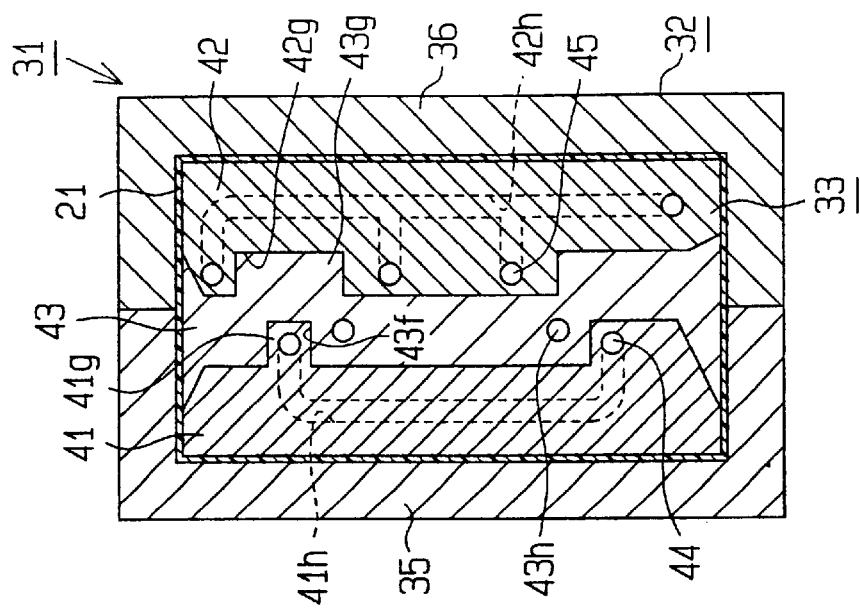
FIG. 11 is a horizontal cross-sectional view showing a modification of an apparatus according to the present invention.

As shown in FIG. 11, the dovetail grooves 43f, 42g and the dovetail projections 41g, 43g of the first embodiment may be replaced by plain grooves and projections. In this case, after moving the intermediate core 43 upward from the inner slidable cores 41, 42 by means of the rod 46, the cores 41, 42 are moved toward each other by means of the rods 44, 45. The inner slidable cores 41, 42 are then separated by moving upward from the molded product by means of the rods 44, 45.

Figure 12:
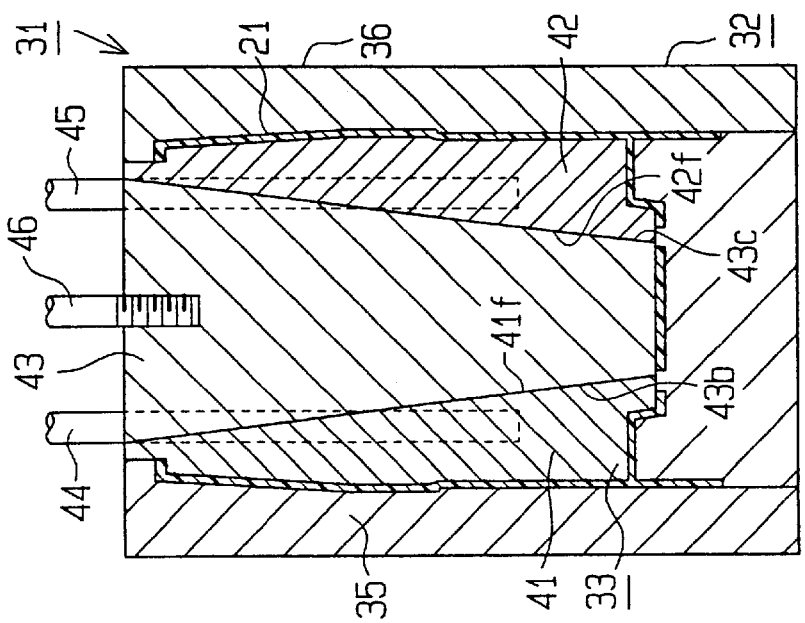
FIG. 12 is a vertical cross-sectional view showing another modification of an apparatus according to the present invention.
Figure 13:
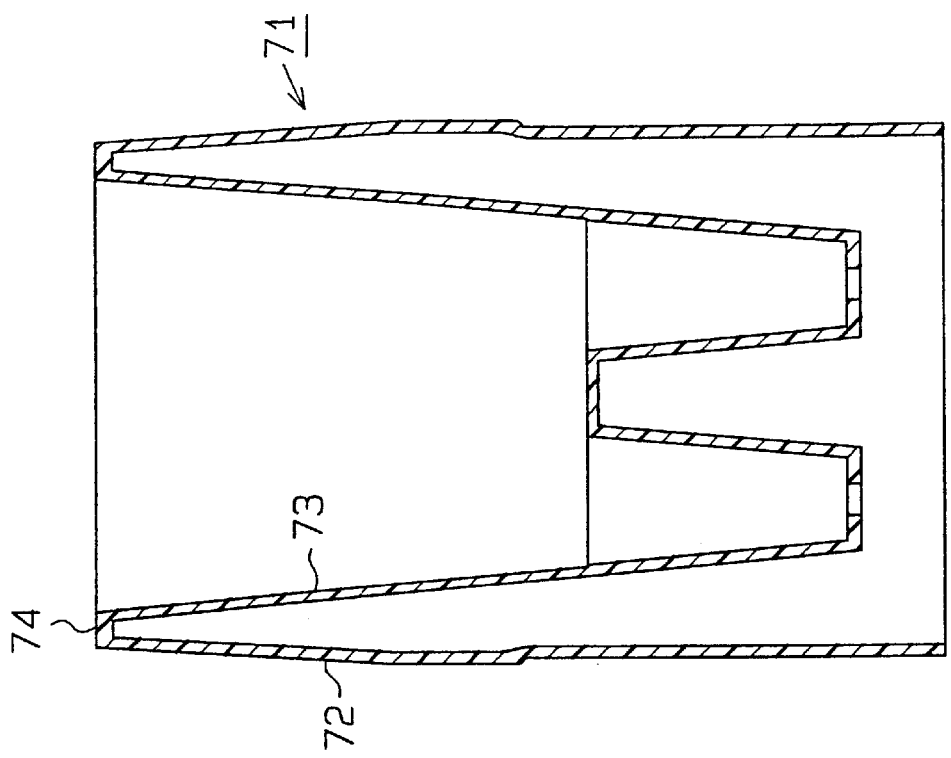
FIG. 13 is a vertical cross-sectional view showing a prior art console box.
Figure 14:
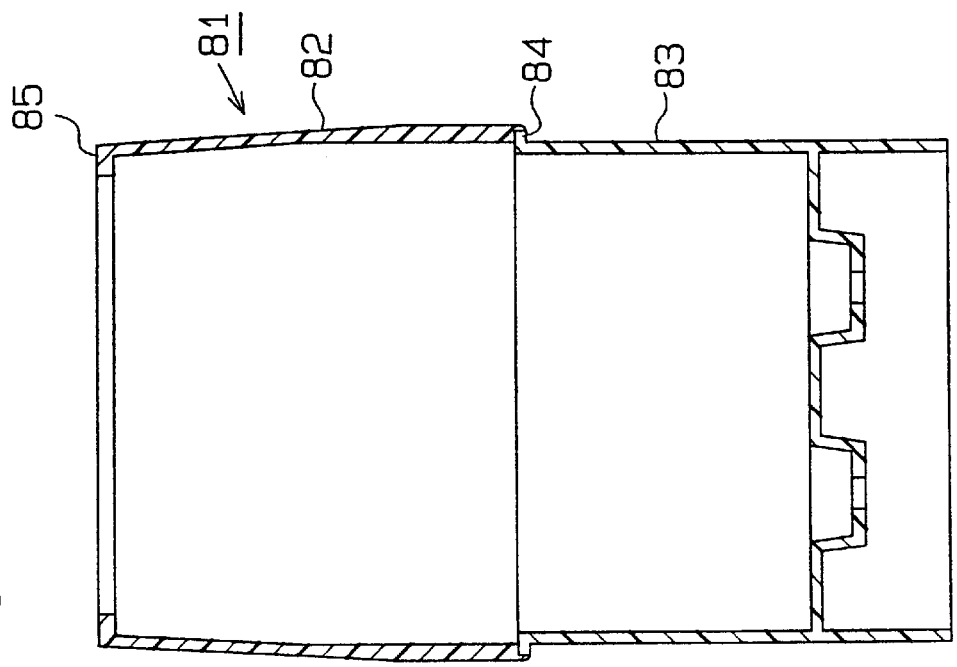
FIG. 14 is a vertical cross-sectional view showing another prior art console box.

As shown in FIG. 12, the inner slidable cores 41, 42 and the intermediate core 43 may be configured without the dovetail grooves 43f, 42g and the dovetail projections 41g, 43g of the first embodiment or the plain grooves and projections of FIG. 11. In this case, like the modification of FIG. 11, after separating from the intermediate core 43 by moving upward from the inner slidable cores 41, 42 by means of the rod 46, the cores 41, 42 are moved toward each other by means of the rods 44, 45. The inner slidable cores 41, 42 are then moved upward and separated from the molded product by means of the rods 44, 45.

Accordingly, also in the modifications of FIGS. 11 and 12, a console box 21 having an increased capacity is formed easily and inexpensively.

In the second embodiment, the mold separating rods 44, 45 may be urged by an elastic member such as a spring or a gas pressure cylinder. Further, in the first embodiment, the mold separating rod 46 may be urged upward even when the movable mold member 34 remains in contact with the fixed mold member 32*a*. When the movable mold member 34 is separated from the fixed mold member 32*a*, movement of the movable mold member 34 is transmitted to the intermediate core 43. The console box 21 is thus readily separated from the apparatus 31 when molding is completed.

In each embodiment, instead of coolant water, coolant fluid such as refrigerant or cool gas may be circulated in the passages 41*h*, 42*h*, 43*h* of the cores 41, 42, 43 to cool the resin retained in the cavity.

The molding apparatus 31 of the present invention is not restricted to molding of the console box 21. The molding apparatus 31 may be applied to, for example, molding of a container having flanges extending inward from upper ends of side plates. Alternatively, the apparatus 31 may be applied to molding of a channel-like resin product including a bottom plate and a pair of side plates.

Therefore, the present examples and embodiments are to be considered as illustrative and not restrictive and the invention is not to be limited to the details given herein, but may be modified within the scope and equivalence of the appended claims.

What is claimed is:

1. An apparatus for molding a resin product having a bottom plate, a pair of side plates, and a pair of flanges, wherein the side plates are formed integrally with the bottom plate to extend from opposite sides of the bottom plate, and each flange is formed integrally with the associated side plate to extend inward from an upper end of the side plate, the apparatus comprising:

a pair of inner slidable cores for shaping an upper side of the bottom plate, an inner side of each side plate, and a lower side of each flange, wherein each inner slidable core has a passage through which a coolant fluid is circulated;

an intermediate core located between the inner slidable cores for positioning each inner slidable core at a predetermined location; and a sliding mechanism for sliding each inner slidable core to a position spaced from the resin product while moving the pair of inner slidable cores relative to the intermediate core.

2. The apparatus for molding the resin product as set forth in claim 1, wherein the intermediate core is moved with respect to the inner slidable cores.

3. The apparatus for molding the resin product as set forth in claim 1, wherein the intermediate core is stationary.

4. The apparatus for molding the resin product as set forth in claim 1, wherein the relative movement between the inner slidable cores and the intermediate core occurs substantially simultaneously with a separation of an outer mold member, which shapes an outer side of the resin product, from the resin product.

5. The apparatus for molding the resin product as set forth in claim 4 further comprising:

an urging device for urging at least the inner slidable cores toward positions or the intermediate core toward a position spaced from the resin product; and a transmitting device for transmitting movement of the outer mold member to the inner slidable cores or the intermediate core.

6. The apparatus for molding the resin product as set forth in claim 1, wherein the sliding mechanism includes:

a pair of tapered surfaces formed along opposite sides of the intermediate core, wherein the distance between the tapered surfaces decreases toward a lower end of the intermediate core; and a pair of inclined surfaces, each formed along an inner side of the associated inner slidable core, wherein each inclined surface engages and slides with respect to the associated tapered surface.

7. The apparatus for molding the resin product as set forth in claim 6, wherein:

an engaging groove is formed in one tapered surface of the intermediate core, and an engaging projection that extends from the inclined surface of one inner slidable core engages with the engaging groove of the intermediate core; and an engaging projection extends from the other tapered surface of the intermediate core, and an engaging groove is formed in the inclined surface of the other inner slidable core and engages with the engaging projection of the intermediate core.

8. The apparatus for molding the resin product as set forth in claim 7, wherein:

the engaging grooves are dovetail grooves;

the engaging projections are dovetail projections; and the inner slidable cores slide toward each other during the relative movement between the pair of inner slidable cores and the intermediate core.

9. The apparatus for molding the resin product as set forth in claim 7, wherein a lower section of the engaging groove of one inner slidable core engages with a lower section of the engaging projection of the other inner slidable core when the inner slidable cores are located at the positions spaced from the resin product.

10. The apparatus for molding the resin product as set forth in claim 1, wherein the inner slidable cores and the intermediate core each have a shaping surface for shaping an inner surface of the resin product.

11. The apparatus for molding the resin product as set forth in claim 1, wherein a mold separating rod is connected to each inner slidable core or the intermediate core.

12. The apparatus for molding the resin product as set forth in claim 1, wherein the resin product is a console box for a vehicle.

* * * * *